US012625291B2

(12) United States Patent
Jalilian et al.

(10) Patent No.: US 12,625,291 B2
(45) Date of Patent: May 12, 2026

(54) WIND DETECTION METHOD AND SYSTEM

(71) Applicant: Hifi Engineering Inc., Calgary (CA)

(72) Inventors: Seyed Ehsan Jalilian, Calgary (CA); Yuhong Liu, Calgary (CA)

(73) Assignee: HIFI ENGINEERING INC., Alberta Calgary (CA)

( * ) Notice: Subject to any disclaimer, the term of this patent is extended or adjusted under 35 U.S.C. 154(b) by 532 days.

(21) Appl. No.: 18/065,192

(22) Filed: Dec. 13, 2022

(65) Prior Publication Data

US 2024/0184006 A1 Jun. 6, 2024

(30) Foreign Application Priority Data

Dec. 1, 2022 (CA) ...................................... 3182989

(51) Int. Cl.
| | |
|---|---|
| *G01V 1/36* | (2006.01) |
| *G01H 9/00* | (2006.01) |
| *G01V 1/00* | (2006.01) |
| *G01V 1/22* | (2006.01) |

(52) U.S. Cl.
CPC ............... *G01V 1/36* (2013.01); *G01H 9/004* (2013.01); *G01V 1/001* (2013.01); *G01V 1/226* (2013.01)

(58) Field of Classification Search
CPC .......... G01V 1/36; G01V 1/001; G01V 1/226; G01H 9/004
See application file for complete search history.

(56) References Cited

U.S. PATENT DOCUMENTS

| | | | | |
|---|---|---|---|---|
| 7,876,918 | B2 * | 1/2011 | Luo ...................... | H04R 25/407 |
| | | | | 29/896.21 |
| 11,953,385 | B2 * | 4/2024 | Hull ................... | G01D 5/35309 |
| 11,959,798 | B2 * | 4/2024 | Gérard ...................... | G01P 5/00 |
| 2019/0137045 | A1 * | 5/2019 | Jalilian ................... | G01M 3/38 |
| 2020/0149951 | A1 * | 5/2020 | Gérard ................... | G01P 13/02 |

FOREIGN PATENT DOCUMENTS

| | | |
|---|---|---|
| WO | 2013102252 A1 | 7/2013 |
| WO | 2016000064 A1 | 1/2016 |
| WO | 2018223236 A1 | 12/2018 |
| WO | 2022032379 A1 | 2/2022 |

* cited by examiner

*Primary Examiner* — Francis C Gray

(74) *Attorney, Agent, or Firm* — D'Ambrosio & Menon, PLLC; Usha Menon

(57) ABSTRACT

Methods, systems, and techniques for wind detection. A first acoustic signal generated by an acoustic sensor positioned to be actuated in response to wind is measured. An average value of the first acoustic signal over a sampling duration is determined. The average value may be a median, and the sampling duration may be at least 15 minutes. If the average value of the first acoustic signal satisfies a wind detection threshold, the first acoustic signal is determined to be generated by the wind.

20 Claims, 12 Drawing Sheets

800

802

Measure a first acoustic signal generated by an acoustic sensor positioned to be actuated in response to wind

804

Determine an average value of the first acoustic signal over a sampling duration

806

Determine that the average value satisfies a wind detection threshold

808

Determine that the first acoustic signal was generated by the wind

1100

1102

Detect a potential intrusion event across a fence and into a monitored area

1104

Determine that the potential intrusion event has a cause other than wind

1106

In response to determining that the potential intrusion event has a cause other than wind, determine that the potential intrusion event is an actual intrusion event

WIND DETECTION METHOD AND SYSTEM

CROSS-REFERENCE TO RELATED APPLICATIONS

This application is related to and claims priority to Canadian Patent Application No.: 3182989 filed on Dec. 1, 2022, the contents of which are incorporated by reference herein.

TECHNICAL FIELD

The present disclosure relates to methods, systems, and techniques for wind detection.

BACKGROUND

In the context of a physical security system, it can be useful to be able to automatically recognize intrusion events that result from an actual or attempted unauthorized entry of a person or animal into a monitored area. One problem that can arise in such a context is how to distinguish between an actual intrusion event, and false alarms such as those caused by wind.

SUMMARY

According to a first aspect, there is provided a wind detection method comprising: measuring a first acoustic signal generated by an acoustic sensor positioned to be actuated in response to wind; determining an average value of the first acoustic signal over a sampling duration; determining that the average value of the first acoustic signal satisfies a wind detection threshold; and after determining that the average value of the first acoustic signal satisfies a wind detection threshold, determining that the first acoustic signal was generated by the wind.

The acoustic sensor may comprise a first optical fiber comprising at least one pair of fiber Bragg gratings (FBGs) tuned to reflect substantially identical wavelengths.

Measuring the first acoustic signal may comprise: shining a reference light pulse and a sensing light pulse along the first optical fiber, the reference light pulse being delayed compared to the sensing light pulse by a predetermined period of time selected such that the reference light pulse reflected by a first FBG of the at least one pair of FBGs interferes with the sensing light pulse reflected by a second FBG of the at least one pair of FBGs to form a combined interference pulse; detecting the light reflected by the at least one pair of FBGs; and detecting the combined interference pulse and detecting a phase difference between the reflected reference light pulse and the reflected sensing light pulse of the combined interference pulse to produce a first acoustic signal measurement.

The first optical fiber may comprise measurement channels respectively corresponding to different longitudinal positions along the first optical fiber; each of the measurement channels may comprise at least one pair of the FBGs tuned to reflect substantially identical wavelengths; and the first acoustic signal may be measured at one of the measurement channels.

The first optical fiber may be mounted on a fence.

The average value of the first acoustic signal may be a median of the first acoustic signal.

The average value of the first acoustic signal may be the median of a root mean square of the first acoustic signal, or a bandpass filtered version of the root mean square.

The sampling duration may be at least 15 minutes.

According to another aspect, there is provided an intrusion detection method comprising: detecting a potential intrusion across a fence and into a monitored area, wherein the detecting comprises measuring a first acoustic signal generated by an acoustic sensor positioned to monitor for intrusions into a monitored area; determining that the potential intrusion has a cause other than wind; and in response to determining that the potential intrusion is has a cause other than wind, determining that the potential intrusion is an actual intrusion.

The method may further comprise orienting a video camera at a location corresponding to a source of the actual intrusion event.

Determining that the potential intrusion event has a cause other than wind may comprise determining that an energy acceleration of the first acoustic signal satisfies an intrusion energy acceleration threshold.

Determining that the potential intrusion event has a cause other than wind may comprise: determining an average value of the first acoustic signal over a sampling duration; and determining that the average value of the first acoustic signal satisfies a wind detection threshold.

The average value of the first acoustic signal may be a median of the first acoustic signal, and the sampling duration may be at least 15 minutes. The average value may also be determined as a median of a bandpass filtered version of the first acoustic signal.

The acoustic sensor may comprise a first optical fiber comprising at least one pair of fiber Bragg gratings (FBGs) tuned to reflect substantially identical wavelengths.

Measuring the first acoustic signal may comprise: shining a reference light pulse and a sensing light pulse along the first optical fiber, the reference light pulse being delayed compared to the sensing light pulse by a predetermined period of time selected such that the reference light pulse reflected by a first FBG of the at least one pair of FBGs interferes with the sensing light pulse reflected by a second FBG of the at least one pair of FBGs to form a combined interference pulse; detecting the light reflected by the at least one pair of FBGs; and detecting the combined interference pulse and detecting a phase difference between the reflected reference light pulse and the reflected sensing light pulse of the combined interference pulse to produce a first acoustic signal measurement.

The first optical fiber may comprise measurement channels respectively corresponding to different longitudinal positions along the first optical fiber; each of the measurement channels may comprise at least one pair of the FBGs tuned to reflect substantially identical wavelengths; and the first acoustic signal may be measured at one of the measurement channels.

Determining that the potential intrusion event has a cause other than wind may comprise: measuring a second acoustic signal at another of the measurement channels on the first optical fiber, or on a measurement channel of a second optical fiber in acoustic proximity to the first optical fiber; determining a cross-correlation between the first and second acoustic signals; and determining that the cross-correlation satisfies a cross-correlation threshold.

Determining that the potential intrusion event has a cause other than wind may comprise: measuring a second acoustic signal at another of the measurement channels on the first optical fiber, or on a measurement channel of a second optical fiber in acoustic proximity to the first optical fiber; and determining that each of the first and second acoustic signals satisfy an intrusion threshold.

One of the first and second optical fibers may be mounted on a fence, and the other of the first and second optical fibers may be on or buried in ground.

According to another aspect, there is provided a system comprising: at least one optical fiber comprising at least one pair of fiber Bragg gratings (FBGs) tuned to reflect substantially identical wavelengths; an optical interrogator optically coupled to the at least one optical fiber and configured to perform optical interferometry using the at least one optical fiber; and at least one processing device communicatively coupled to the optical interrogator, wherein the at least one processing device is configured to perform the methods described above.

According to another aspect, there is provided da non-transitory computer readable medium having stored thereon computer program code that is executable by a processor and that, when executed by the processor, causes the processor to perform the methods described above.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

Embodiments of the disclosure will now be described in detail in conjunction with the accompanying drawings of which.

DETAILED DESCRIPTION

Fiber optic cables are often used as distributed measurement systems in acoustic sensing applications. Pressure changes, due to sound waves for example, in the space immediately surrounding an optical fiber and that encounter the optical fiber cause dynamic strain in the optical fiber. Optical interferometry may be used to detect the dynamic strain along a segment of the fiber. Optical interferometry is a technique in which two separate light pulses, a sensing pulse and a reference pulse, are generated and interfere with each other. The sensing and reference pulses may, for example, be directed along an optical fiber that comprises fiber Bragg gratings. The fiber Bragg gratings partially reflect the pulses back towards an optical receiver at which an interference pattern is observed.

The nature of the interference pattern observed at the optical receiver provides information on the optical path length the pulses traveled, which in turn provides information on parameters such as the strain experienced by the segment of optical fiber between the fiber Bragg gratings. Information on the strain then provides information about the event that caused the strain.

Figure 1A:
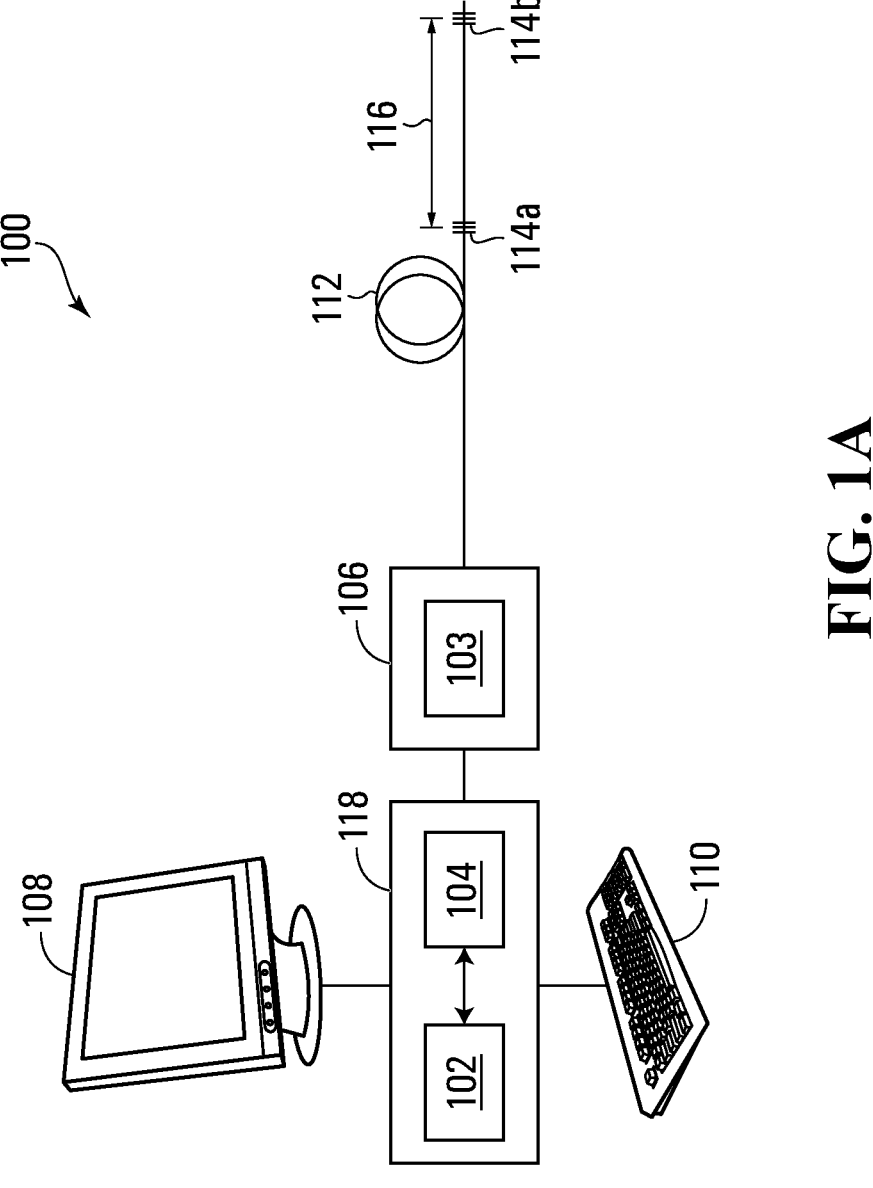
FIG. 1A is a block diagram of an optical interrogation system including an optical fiber with fiber Bragg gratings ("FBGs") for reflecting a light pulse, in accordance with embodiments of the disclosure.

Referring now to FIG. 1A, there is shown one embodiment of a system 100 for performing interferometry using fiber Bragg gratings ("FBGs"), in accordance with embodiments of the disclosure. The system 100 comprises optical fiber 112, an interrogator 106 optically coupled to the optical fiber 112, and a signal processing device 118 that is communicative with the interrogator 106.

The optical fiber 112 comprises one or more fiber optic strands, each of which is made from quartz glass (amorphous $SiO_2$). The fiber optic strands are doped with various elements and compounds (including germanium, erbium oxides, and others) to alter their refractive indices, although in alternative embodiments the fiber optic strands may not be doped. Single mode and multimode optical strands of fiber are commercially available from, for example, Corning® Optical Fiber. Example optical fibers include ClearCurve™ fibers (bend insensitive), SMF28 series single mode fibers such as SMF-28 ULL fibers or SMF-28e fibers, and InfiniCor® series multimode fibers.

The interrogator 106 generates the sensing and reference pulses and outputs the reference pulse after the sensing pulse. The pulses are transmitted along optical fiber 112 that comprises a first pair of FBGs. The first pair of FBGs comprises first and second FBGs 114a,b (generally, "FBGs 114"). The first and second FBGs 114a,b are separated by a certain segment 116 of the optical fiber 112 ("fiber segment 116"). The optical length of the fiber segment 116 varies in response to dynamic strain that the fiber segment 116 experiences.

The light pulses have a wavelength identical or very close to the center wavelength of the FBGs 114, which is the wavelength of light the FBGs 114 are designed to partially reflect; for example, typical FBGs 114 are tuned to reflect light in the 1,000 to 2,000 nm wavelength range. The sensing and reference pulses are accordingly each partially reflected by the FBGs 114a,b and return to the interrogator 106. The delay between transmission of the sensing and reference pulses is such that the reference pulse that reflects off the first FBG 114a (hereinafter the "reflected reference pulse") arrives at the optical receiver 103 simultaneously with the sensing pulse that reflects off the second FBG 114b (hereinafter the "reflected sensing pulse"), which permits optical interference to occur.

While FIG. 1A shows only the one pair of FBGs 114a,b, in alternative embodiments (not depicted) any number of FBGs 114 may be on the fiber 112, and time division multiplexing (TDM) (and, optionally, wavelength division multiplexing (WDM)) may be used to simultaneously obtain measurements from them. If two or more pairs of FBGs 114 are used, any one of the pairs may be tuned to reflect a different center wavelength than any other of the pairs. Alternatively, a group of multiple FBGs 114 may be tuned to reflect a different center wavelength to another group of multiple FBGs 114, and there may be any number of groups of multiple FBGs extending along the optical fiber 112 with each group of FBGs 114 tuned to reflect a different center wavelength. In these example embodiments where different pairs or group of FBGs 114 are tuned to reflect different center wavelengths to other pairs or groups of FBGs 114. WDM may be used in order to transmit and to receive light from the different pairs or groups of FBGs 114, effectively extending the number of FBG pairs or groups that can be used in series along the optical fiber 112 by reducing the effect of optical loss that otherwise would have resulted from light reflecting from the FBGs 114 located on the fiber 112 nearer to the interrogator 106. When different pairs of the FBGs 114 are not tuned to different center wavelengths, TDM is sufficient.

The interrogator 106 emits laser light with a wavelength selected to be identical or sufficiently near the center wavelength of the FBGs 114, and each of the FBGs 114 partially reflects the light back towards the interrogator 106. The timing of the successively transmitted light pulses is such that the light pulses reflected by the first and second FBGs 114a,b interfere with each other at the interrogator 106, which records the resulting interference signal. The strain that the fiber segment 116 experiences alters the optical path length between the two FBGs 114 and thus causes a phase difference to arise between the two interfering pulses. The resultant optical power at the optical receiver 103 can be used to determine this phase difference. Consequently, the interference signal that the interrogator 106 receives varies with the strain the fiber segment 116 is experiencing, which allows the interrogator 106 to estimate the strain the fiber segment 116 experiences from the received optical power. The interrogator 106 digitizes the phase difference ("output signal") whose magnitude and frequency vary directly with the magnitude and frequency of the dynamic strain the fiber segment 116 experiences.

The signal processing device 118 is communicatively coupled to the interrogator 106 to receive the output signal. The signal processing device 118 includes a processor 102 and a non-transitory computer-readable medium 104 that are communicatively coupled to each other. An input device 110 and a display 108 interact with the signal processing device 118. The computer-readable medium 104 has stored on it program code to cause the signal processing device 118 to perform any suitable signal processing methods to the output signal. For example, if the fiber segment 116 is laid adjacent a region of interest that is simultaneously experiencing vibration at a rate under 20 Hz and acoustics at a rate over 20 Hz, the fiber segment 116 will experience similar strain and the output signal will comprise a superposition of signals representative of that vibration and those acoustics. The signal processing device 118 may apply to the output signal a low pass filter with a cut-off frequency of 20 Hz, to isolate the vibration portion of the output signal from the acoustics portion of the output signal. Analogously, to isolate the acoustics portion of the output signal from the vibration portion, the signal processing device 118 may apply a high-pass filter with a cut-off frequency of 20 Hz. The signal processing device 118 may also apply more complex signal processing methods to the output signal; example methods include those described in PCT application PCT/CA2012/000018 (publication number WO 2013/102252), the entirety of which is hereby incorporated by reference.

Figures 1B, 1C:
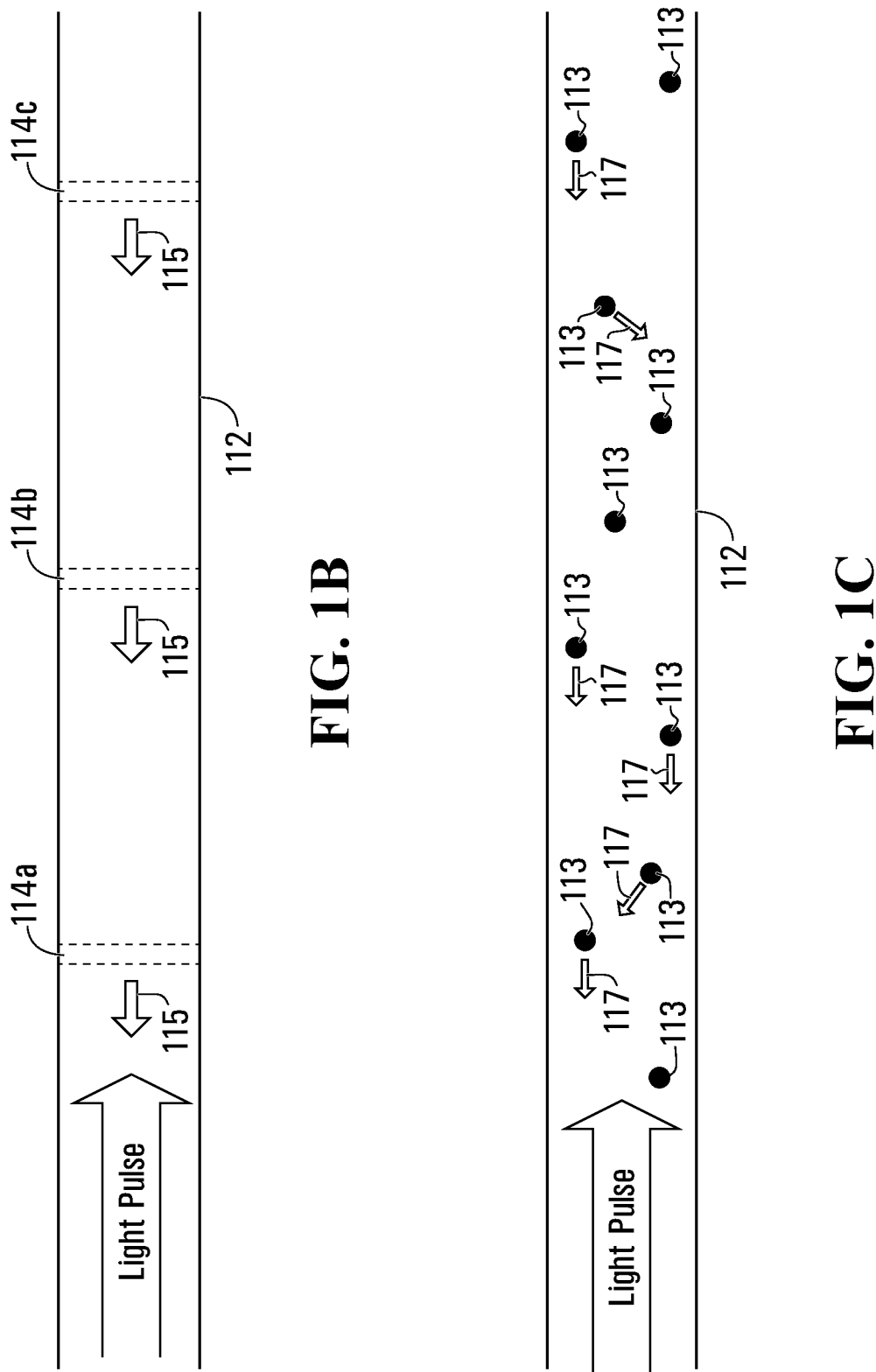
FIG. 1B is a schematic diagram that depicts how the FBGs reflect a light pulse, in accordance with embodiments of the disclosure.
FIG. 1C is a schematic diagram that depicts how a light pulse interacts with impurities in an optical fiber that results in scattered laser light due to Rayleigh scattering, which is used for distributed acoustic sensing ("DAS"), in accordance with embodiments of the disclosure.

FIG. 1B depicts how the FBGs 114 reflect the light pulse, according to another embodiment in which the optical fiber 112 comprises a third FBG 114c. In FIG. 1B, the second FBG 114b is equidistant from each of the first and third FBGs 114a,c when the fiber 112 is not strained. The light pulse is propagating along the fiber 112 and encounters three different FBGs 114, with each of the FBGs 114 reflecting a portion 115 of the pulse back towards the interrogator 106. In embodiments comprising three or more FBGs 114, the portions of the sensing and reference pulses not reflected by the first and second FBGs 114a,b can reflect off the third FBG 114c and any subsequent FBGs 114, resulting in interferometry that can be used to detect strain along the fiber 112 occurring further from the interrogator 106 than the second FBG 114b. For example, in the embodiment of FIG. 1B, a portion of the sensing pulse not reflected by the first and second FBGs 114a,b can reflect off the third FBG 114c, and a portion of the reference pulse not reflected by the first FBG 114a can reflect off the second FBG 114b, and these reflected pulses can interfere with each other at the interrogator 106.

Any changes to the optical path length of the fiber segment 116 result in a corresponding phase difference between the reflected reference and sensing pulses at the interrogator 106. Since the two reflected pulses are received as one combined interference pulse, the phase difference between them is embedded in the combined signal. This phase information can be extracted using proper signal processing techniques, such as phase demodulation. The relationship between the optical path of the fiber segment 116 and that phase difference ($\Theta$) is as follows:

$$\Theta = 2\pi n L / \lambda,$$

where n is the index of refraction of the optical fiber, L is the physical path length of the fiber segment 116, and $\lambda$ is the wavelength of the optical pulses. A change in nL is caused by the fiber experiencing longitudinal strain induced by energy being transferred into the fiber. The source of this energy may be, for example, an object outside of the fiber experiencing dynamic strain, undergoing vibration, or emitting energy. As used herein, "dynamic strain" refers to strain that changes over time. Dynamic strain that has a frequency of between about 5 Hz and about 20 Hz is referred to by persons skilled in the art as "vibration", dynamic strain that has a frequency of greater than about 20 Hz is referred to by persons skilled in the art as "acoustics", and dynamic strain that changes at a rate of <1 Hz, such as at 500 µHz, is referred to as "sub-Hz strain".

One conventional way of determining ΔnL is by using what is broadly referred to as distributed acoustic sensing ("DAS"). DAS involves laying the fiber 112 through or near a region of interest and then sending a coherent laser pulse along the fiber 112. As shown in FIG. 1C, the laser pulse interacts with impurities 113 in the fiber 112, which results in scattered laser light 117 because of Rayleigh scattering. Vibration or acoustics emanating from the region of interest results in a certain length of the fiber becoming strained, and the optical path change along that length varies directly with the magnitude of that strain. Some of the scattered laser light 117 is back-scattered along the fiber 112 and is directed towards the optical receiver 103, and depending on the amount of time required for the scattered light 117 to reach the receiver and the phase of the scattered light 117 as determined at the receiver, the location and magnitude of the vibration or acoustics can be estimated with respect to time. DAS relies on interferometry using the reflected light to estimate the strain the fiber experiences. The amount of light that is reflected is relatively low because it is a subset of the scattered light 117. Consequently, and as evidenced by comparing FIGS. 1B and 1C, Rayleigh scattering transmits less light back towards the optical receiver 103 than using the FBGs 114.

DAS accordingly uses Rayleigh scattering to estimate the magnitude, with respect to time, of the strain experienced by the fiber during an interrogation time window, which is a proxy for the magnitude of the vibration or acoustics emanating from the region of interest. In contrast, the embodiments described herein measure dynamic strain using interferometry resulting from laser light reflected by FBGs 114 that are added to the fiber 112 and that are designed to reflect significantly more of the light than is reflected as a result of Rayleigh scattering. This contrasts with an alternative use of FBGs 114 in which the center wavelengths of the FBGs 114 are monitored to detect any changes that may result to it in response to strain. In the depicted embodiments, groups of the FBGs 114 are located along the fiber 112. A typical FBG can have a reflectivity rating of between 0.1% and 5%. The use of FBG-based interferometry to measure dynamic strain offers several advantages over DAS, in terms of optical performance.

Figure 2:
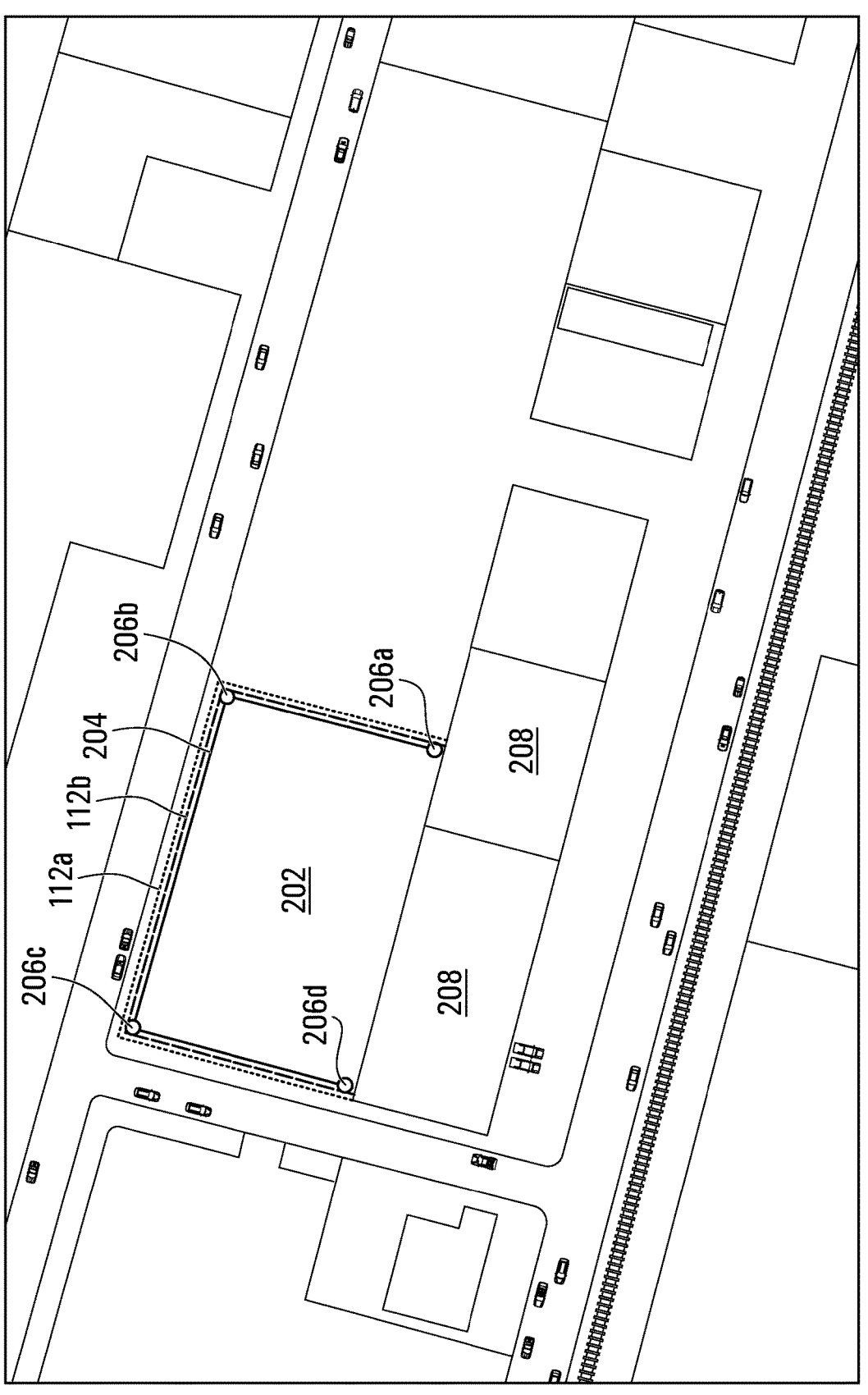
FIG. 2 is a map of an area that is monitored by an example intrusion detection system that comprises the optical interrogation system of FIG. 1A.

Referring now to FIG. 2, there is shown a map of an area that is monitored by an example intrusion detection system 200 that comprises the system 100 for performing interferometry of FIG. 1A. As used herein, an "intrusion" is an unauthorized entry into a monitored area 202 across some kind of monitored delineation between the monitored area 202 and an unmonitored area. In FIG. 2, the monitored area 202 is a rectangular, fenced area delineated on three sides by a fence 204 that is monitored using an implementation of the system 100 for performing interferometry, with a fourth side being delineated by buildings 208. As discussed in further detail below, the fence 204 is monitored in this embodiment by first through third optical fibers 112a-c: a first ground optical fiber 112a that is positioned acoustically proximate the fence 204 outside the monitored area 202; a second ground optical fiber 112b that is positioned acoustically proximate the fence 204 outside of the monitored area 202 and further away from the fence 202; and a fence optical fiber 112c (shown in FIG. 3) that extends along the fence 204. The first ground optical fiber 112a may be placed between 0 m to 0.5 m away from the base of the fence 204, and the second ground optical fiber 112b may be placed approximately 1 m away from the first ground optical fiber 112a (i.e., approximately 1 m to 1.5 m from the fence 204). In the depicted embodiment, the ground optical fibers 112a,b are placed outside of the monitored area 202 so as to prevent authorized persons walking within the monitored area 202 from accidentally triggering intrusion detections by stepping on or near one or both of the ground optical fibers 112a,b; however, in at least some other embodiments, one or both of the ground optical fibers 112a,b may be placed within the monitored area 202. The optical fibers 112a-c collectively acoustically monitor the monitored area 202. The monitored area 202 is also visually monitored by first through fourth video cameras 206a-d positioned in FIG. 2 at the corners of the monitored area 202. While four cameras 206a-d are used in the example embodiment of FIG. 2, alternative embodiments may comprise more or fewer than four cameras 206a-d, including no cameras.

The signal processing system 118 may collectively be used to interrogate the optical fibers 112a-c and perform optical interferometry as described above in respect of FIGS. 1A-1C. In the current example embodiment, the signal processing system 118 is further communicatively coupled to each of the cameras 206a-d and may be used to control the cameras' 206a-d orientation and consequently field of view, and also to display images, video, and/or audio captured by the cameras 206a-d. In at least some other embodiments, the cameras 206a-d may be controlled by a separate physical security system (not depicted) communicative with the signal processing system 118, and that separate physical security system may be used to control the cameras' 206a-d orientation and consequently field of view, and also to display images, video, and/or audio captured by the cameras 206a-d, in response to the results of the processing made by the signal processing system 118.

Figure 3:
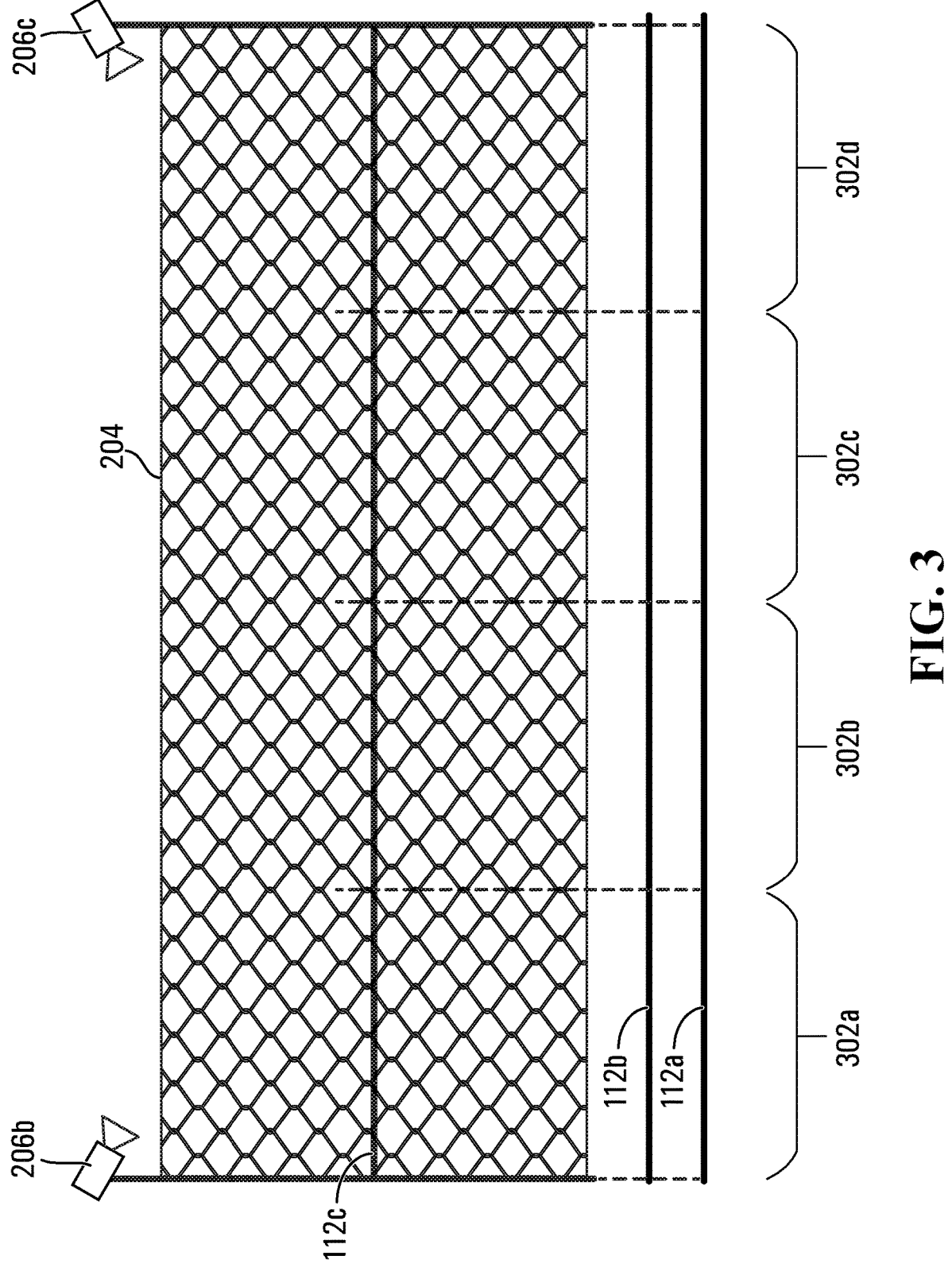
FIG. 3 depicts a segment of a fence partially delineating the area monitored by the intrusion detection system.

FIG. 3 depicts a segment of the fence 204 spanning the second and third cameras 206b,c. At the top of the fence posts are the second and third video cameras 206b,c whose orientation may be controlled by the signal processing device 118, and which send video images back to the signal processing device 118 for display on the display 108. Attached to and running across the length of the fence is the fence optical fiber 112c. On the ground in front of the fence 204 is the first ground optical fiber 112a, and on the ground between the front of the fence 204 and the first ground optical fiber 112a is the second ground optical fiber 112b. The ground optical fibers 112a,b may be buried or lie on top of the ground. As discussed in further detail below, an acoustic event measured by one of the fibers 112a-c may or may not, depending on the nature and magnitude of the event, also be registered by another of the fibers 112a-c.

In FIG. 3, each of the optical fibers 112a-c is divided into first through fourth measurement channels 302a-d respectively corresponding to different fiber segments 116. In order to distinguish between the different measurement channels 302a-d, the interrogator 106 may employ techniques such as time division multiplexing (TDM) or wavelength division multiplexing (WDM), or a combination of both, as described above. For instance, in the context of WDM, different pulses having different wavelengths may be transmitted along the optical fiber 112. Each channel of the optical fiber 112 may be provided with FBGs configured to reflect light having a certain wavelength. Depending on the wavelength of the reflections received from the optical fiber 112, the interrogator 106 may determine from which measurement channel 302a-d the reflections originated from. Example lengths of the fiber segment 116 corresponding to any one of the measurement channels 302a-d are 12.5 m and 25 m.

While FIG. 3 shows the length of this portion of the fence 204 divided into four measurement channels 302a-d, in at least some other embodiments this portion of the fence 204 are monitored using only a single measurement channel, or are divided into more than four measurement channels 302a-d if additional measurement granularity is desired. Additionally, FIG. 3 shows each of the optical fibers 112a-c having an identical number of the measurement channels 302a-d, and the measurement channels 302a-d for each of the fibers 112a-c correspond in position to each other (i.e., as measured from either end of the fence 204, a line extending perpendicularly across the top and bottom of the fence 204 that intersects all three fibers 112a-c intersects the same first measurement channel 302a, second measurement channel 302b, third measurement channel 302c, or fourth measurement channel 302d across all of the fibers 112a-c). However, in at least some other embodiments, the measurement channels 302a-d of the fibers 112a-c may not correspond in position to each other. For example, the first measurement channel 302a of the fence optical fiber 112c may correspond to the second measurement channel 302b of the first ground optical fiber 112a and the third measurement channel 302c of the second ground optical fiber 112b.

The intrusion detection system 200 is used to monitor unauthorized entry into the monitored area 202 by, for example, a person or animal. One problem encountered in practice is how to distinguish an intrusion from what is effectively acoustic noise, such as that generated by the wind. In other words, in certain situations the wind may shake the fence 204, and the intrusion detection system 200 as described below is configured to distinguish between an acoustic event resulting from wind and an actual intrusion event resulting, for example, from a human or animal attempting to scale the fence 204 or otherwise enter the monitored area 204. In order to do this, the intrusion detection system 200 determines whether a potential intrusion is in fact caused by wind. If not, the intrusion detection system 200 concludes that the potential intrusion is an actual intrusion. Accordingly, both intrusion detection and wind detection methods are described below.

Figures 4A, 4B:
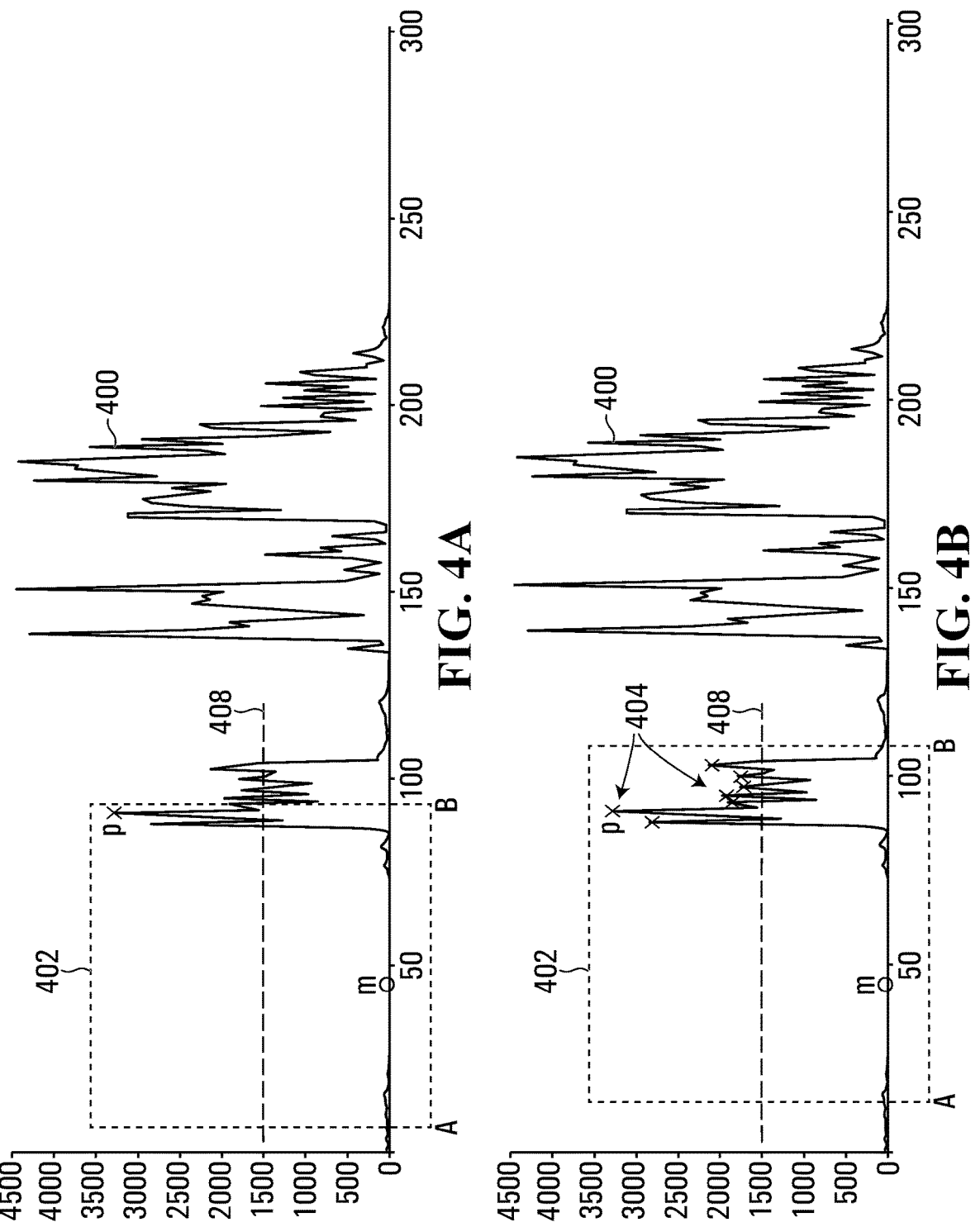
FIGS. 4A and 4B depict example acoustic waveforms resulting from a measurement made along a measurement channel of the intrusion detection system.

Referring now to FIGS. 4A and 4B, there is shown an acoustic waveform 400 resulting from a measurement made along any one of the measurement channels 302a-d. In both FIGS. 4A and 4B, the x-axis represents time in data samples, with each data sample taken 0.1 second apart (i.e., in FIGS. 4A and 4B with 300 samples, the x-axis represents 30 seconds of data), while the y-axis shows intensity as measured in radians, which reflects the interferometric nature of the measurements. In FIG. 4A, a portion of the waveform is highlighted within a window 402. Within the window 402, a median m of the windowed portion of the waveform 400 is noted in FIG. 4A, as is a peak p of the windowed portion of the waveform 400. In at least some embodiments, the intrusion detection system 200 may determine that a potential intrusion has occurred when the ratio of (p/m) satisfies (e.g., is greater than or equal to) an intrusion magnitude threshold 406. The intrusion magnitude threshold 406 may be an empirically determined percentage of the peak p; in FIG. 4A for example, the intrusion magnitude threshold 406 is 40% of the value of the peak p.

In FIG. 4B, the window 402 is expanded to include the peak p of FIG. 4A and also to include additional local maxima 404 adjacent the peak p. Instead of determining whether a potential intrusion has occurred by determining whether the ratio of (p/m) satisfies the intrusion magnitude threshold 406, in FIG. 4B the intrusion detection system 200 determines whether the number of local maxima (including the peak p) above the intrusion magnitude threshold 406 satisfies an intrusion numerical threshold. In FIG. 4B for example, the total number of local maxima 404 over the intrusion magnitude threshold 406 is seven. Consequently, the waveform 400 of FIG. 4B corresponds to a potential intrusion when the intrusion numerical threshold is 7 or fewer. In contrast to FIG. 4A, the "peak counting" of FIG. 4B helps to mitigate the effects of noise, as a higher number of local maxima 404 generally correspond to a longer, sustained signal representative of an actual intrusion event than a noise burst. As used herein, a reference to an acoustic signal satisfying an "intrusion threshold" refers to the acoustic signal satisfying the intrusion magnitude threshold and/or the intrusion numerical threshold.

In order to qualify as a peak p, the system 200 may require the peak p to have a minimum value also in order to mitigate the effects of noise. Due to increased movement experienced on the fence 204 as opposed to on the ground, the minimum value of the peak p when measured using one of the measurement channels 302a-d on the fence 204 may be higher than when the peak p is measured using one of the measurement channels 302a-d of either of the ground optical fibers 112a,b. When measured in radians that are representative of interferometric measurements, for example, the minimum value for the peak p when measured using the fence optical fiber 112c may be approximately 600 radians, and when measured using either of the ground optical fibers 112a,b may be 240 radians.

In order to determine whether a potential intrusion event represents an actual intrusion, the intrusion detection system 200 determines whether the cause of the potential intrusion event was in fact wind. The process by which the system 200 does this is explained below in respect of FIGS. 5 to 8.

Figure 5:
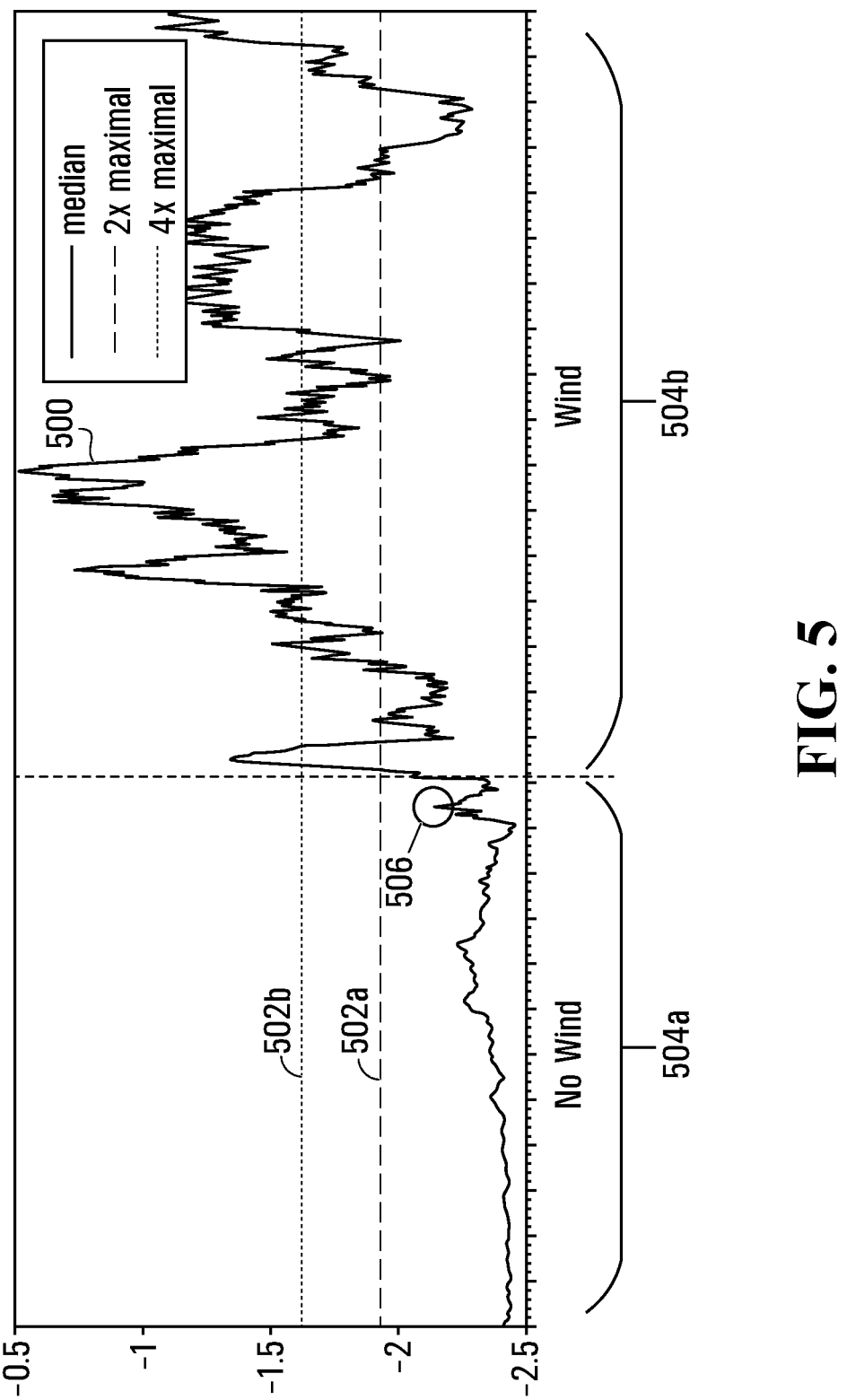
FIGS. 5, 7A, and 7B depict waveforms of bandpass median root mean square (BPRMS) values measured along different measurement channels of the intrusion detection system.

Referring now to FIG. 5, there is shown a waveform 500 of median and bandpass filtered root mean square (BPRMS) acoustic values measured along one of the measurement channels 302a-d of the fence optical fiber 112c. The waveform 500 corresponds to approximately 24 hours of measurements. The horizontal axis represents time, while the vertical axis represents intensity. The waveform 500 shows an initial period 504a of time during which wind is absent, and a subsequent period 504b of time during which wind is present. Each of the measurements used to generate the waveform 500 is bandpass filtered prior to be processed and graphed; in the embodiments described herein, the bandpass filter that is applied has a passband of between 200 Hz to 800 Hz, although different embodiments may not use any bandpass filtering at all while others may apply bandpass filtering with different ranges.

Each of the median values represents a median determined from a collection of interferometric measurements taken over a moving window of an appropriately long sampling duration, such as at least 15 minutes, and in the depicted examples 20 minutes. Measurements are updated at a suitable rate, such as every 0.1 seconds (i.e., the moving window moves a step every 0.1 seconds). In at least some other embodiments, a different type of average value (i.e., mean or mode) may be used to generate the waveform 500, or a moving window may not be used and each value of the waveform 500 may correspond to a measured value and accordingly not represent an average of samples taken over the window. Taking a median of measurements over a sufficiently long window of time, such as 20 minutes, helps to reduce the likelihood that transient events such as an intrusion are misinterpreted as wind.

As is evident from FIG. 5, the intensity of the waveform 500 during the subsequent period 504b of time is higher than that during the initial period 504a of time. In order to conclude that wind is being measured, the intrusion detection system 200 compares median wind values to an appropriate wind detection threshold. FIG. 5 shows different first and second wind detection thresholds 502a,b. How to determine the first and second wind detection thresholds 502a,b is described below in conjunction with FIGS. 6, 7A, and 7B.

Figure 6:
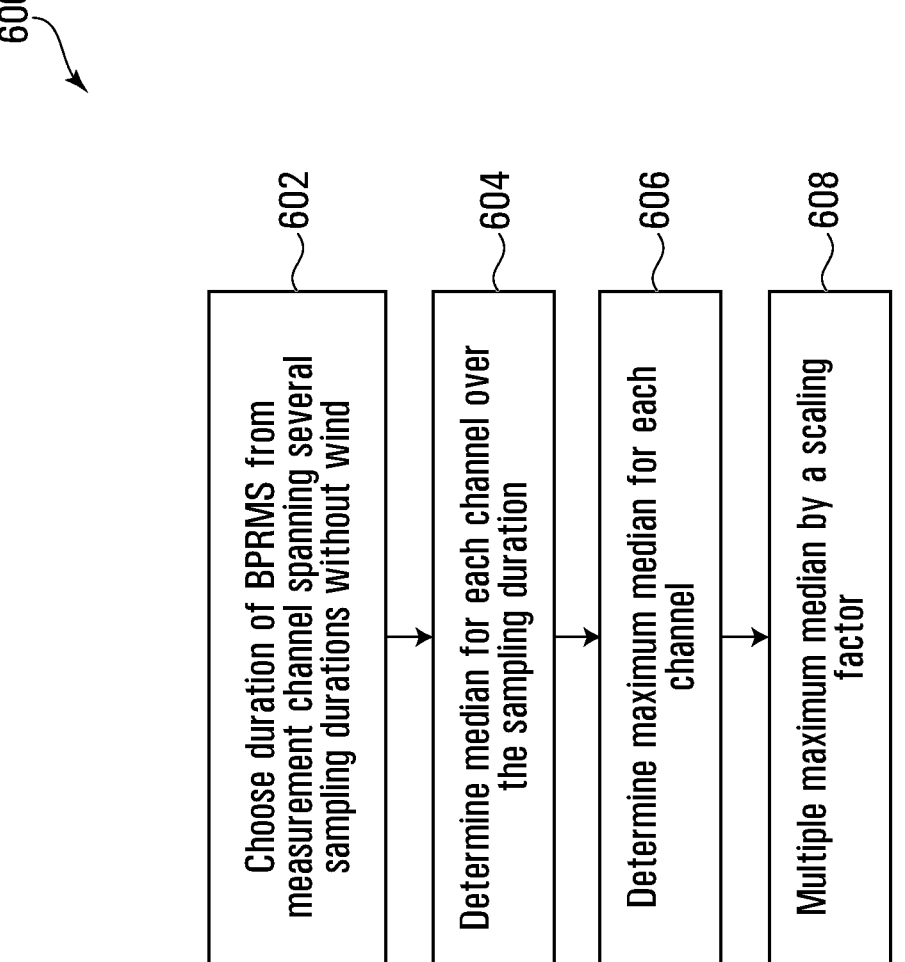
FIG. 6 depicts a method for determining a wind detection threshold, according to an example embodiment.
Figure 7A:
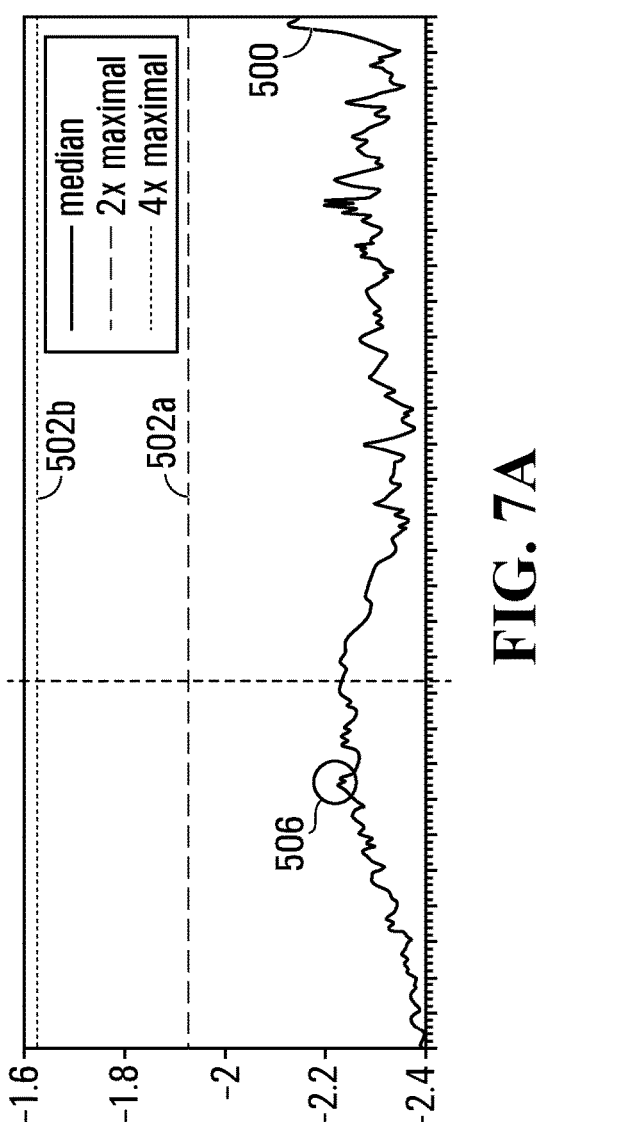
Figure 7B:
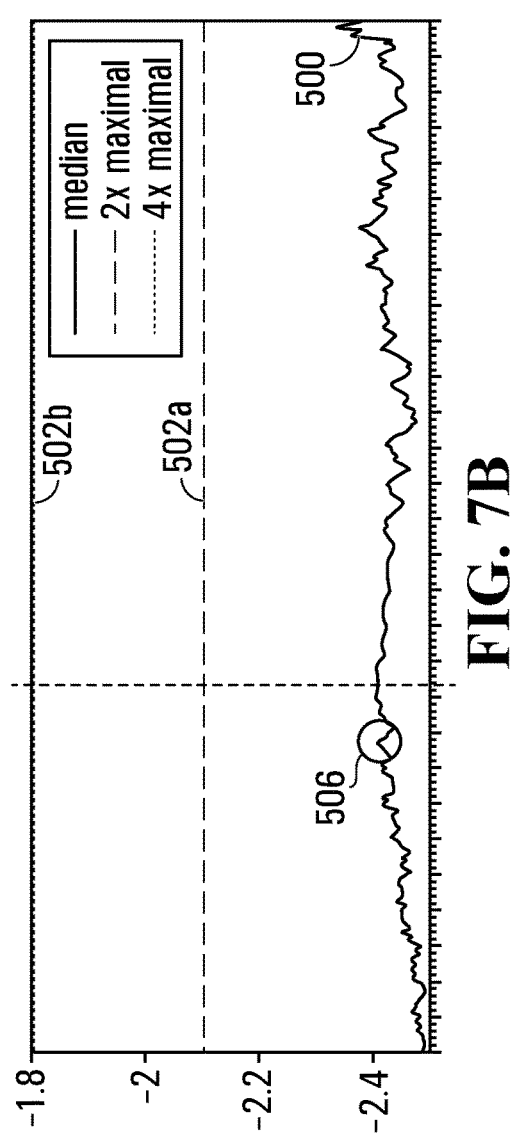

Referring now to FIG. 6, there is shown a method 600 for determining a wind detection threshold. FIGS. 7A and 7B depict acoustic waveforms 500 obtained from one of the measurement channels 302a-d of the first and second ground optical fibers 112a,b over the same time frame as the waveform 500 of FIG. 5. Accordingly, as with the waveform 500 of FIG. 5, the portions of the waveforms 500 of FIGS. 7A and 7B to the left of the vertical dashed line in FIGS. 7A and 7B correspond to no wind being measured, while the portions of the waveforms 500 of FIGS. 7A and 7B to the right of the vertical dashed line correspond to wind being measured. For each of FIGS. 5, 7A, and 7B, the "no wind"

portion of the waveforms 500 corresponds to approximately 8 hours of measurements. These "no wind" portions of the waveforms 500 may be used by the intrusion detection system 200 to determine the wind detection thresholds 502a,b on a per measurement channel 302a-d basis as described in FIG. 6.

At block 602 of FIG. 6, the system 200 chooses a duration of BPRMS signal from the one of the measurement channels 302a-d for which the wind detection threshold is to be determined. The duration of the signal spans several durations of the moving window over which the median signal is determined as described above in respect of FIG. 5; for example, if the moving window has a 20 minute duration as described above, then the minimum duration of the BPRMS signal for use in determining the wind detection threshold may be at least one hour. In FIGS. 5, 7A, and 7B, the duration selected at block 602 may be as much as the approximately 8 hour window to the left of the dashed line in each of the figures.

At block 604, the system 200 determines median values as described above in respect of FIG. 5. Namely, over a moving window of suitable duration (e.g., 20 minutes), the system 200 selects as the interferometric measurement the median value over that window. This is already done in FIGS. 5, 7A, and 7B, with the results being shown as the waveforms 500 themselves.

At block 606, the system 200 determines a value of a maximum median 506 value over the duration selected at block 602. In FIGS. 5, 7A, and 7B, this maximum median 506 is selected over the roughly 8 hour window to the left of the dashed line in each figure and is circled.

At block 608, the system 200 determines the appropriate wind detection threshold by multiplying the maximum median 506 by a scaling factor. To arrive at the first wind detection threshold 502a, a scaling factor of 2 is used; to arrive at the second wind detection threshold 502b, a scaling factor of 4 is used. Regardless of what scaling factor is used, once a suitable scaling factor is determined the intrusion detection system 200 may compare a median value resulting from interferometric measurements and, if the median value satisfies the wind detection threshold, determine that the interferometric measurement results from wind.

Figure 8:
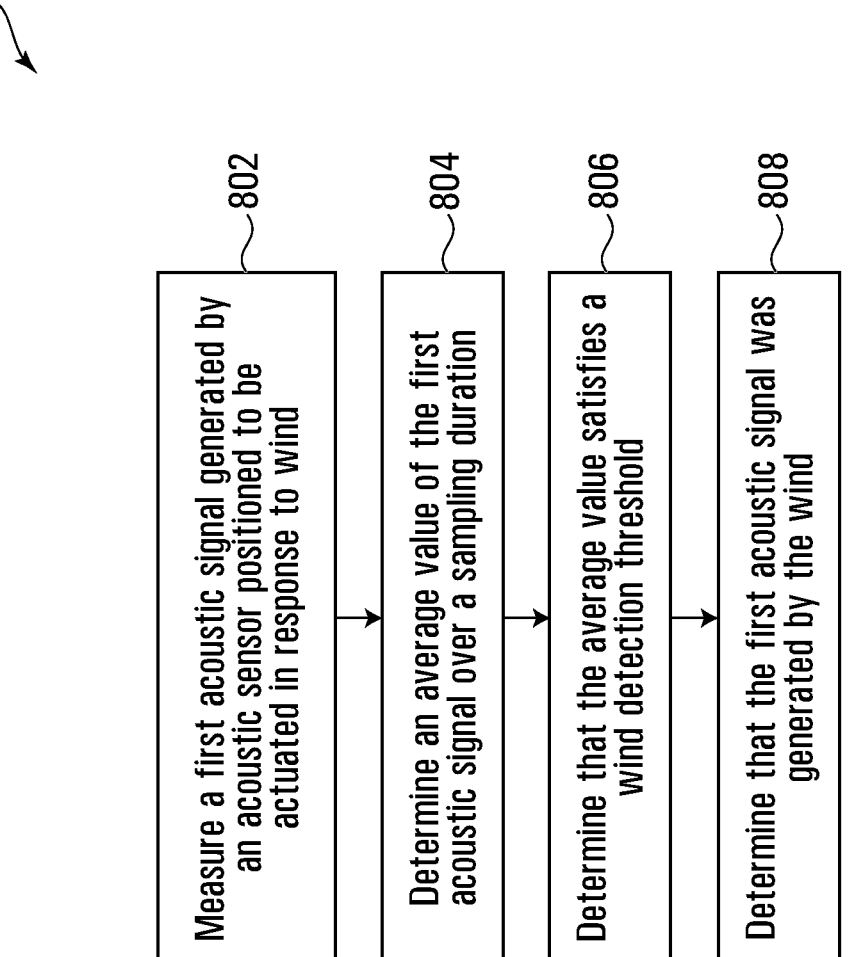
FIG. 8 depicts a method for wind detection, according to an example embodiment.

An example of this is shown in FIG. 8, which is a flowchart that depicts an example method 800 for wind detection. At block 802, the intrusion detection system 200 measures a first acoustic signal generated by an acoustic sensor positioned to be actuated in response to wind. The acoustic sensor may comprise, for example, the optical fibers 112a-c, and the acoustic signals may be obtained using interferometry using the system 100 for performing interferometry as described above. In at least some other embodiments, different types of acoustic sensors may be used, such as microphones. Additionally, in at least some example embodiments other types of distributed optical sensing, such as DAS, may be used to collect the measurements.

After obtaining the first acoustic signal, the intrusion detection system 200 at block 804 determines an average value of the first acoustic signal over a sampling duration. As described above, the sampling duration may be, for example, approximately 20 minutes, the average value may be determined based on a moving window, and the average may be the median measurement recorded over that window. In at least some alternative embodiments, the average value may be the mode or mean as opposed to the median.

At block 806, the intrusion detection system 200 determines that the average value determined at block 804 satisfies a wind detection threshold, such as either the first wind detection threshold 502a or the second wind detection threshold 502b. Once the intrusion detection system 200 makes that determination, it determines at block 808 that the first acoustic signal was generated by the wind.

As described above, the intrusion detection system 200 may obtain measurements using optical interferometry along any one or more measurement channels 302a-d of any of the optical fibers 112a-c. Measurements and subsequent analyses and determinations are made, in at least some embodiments, on a per measurement channel 302a-d basis. For example, wind detection thresholds and BPRMS values are determined on a per measurement channel 302a-d basis.

One issue that can arise in practice is distinguishing between wind noise and an actual intrusion event. For example, an actual intrusion event may result in a signal that exceeds the wind detection threshold. However, it would be undesirable for the intrusion detection system 200 to conclude that the actual intrusion event, which could be caused by a person trying to gain unauthorized access to the monitored area 202.

Figure 9:
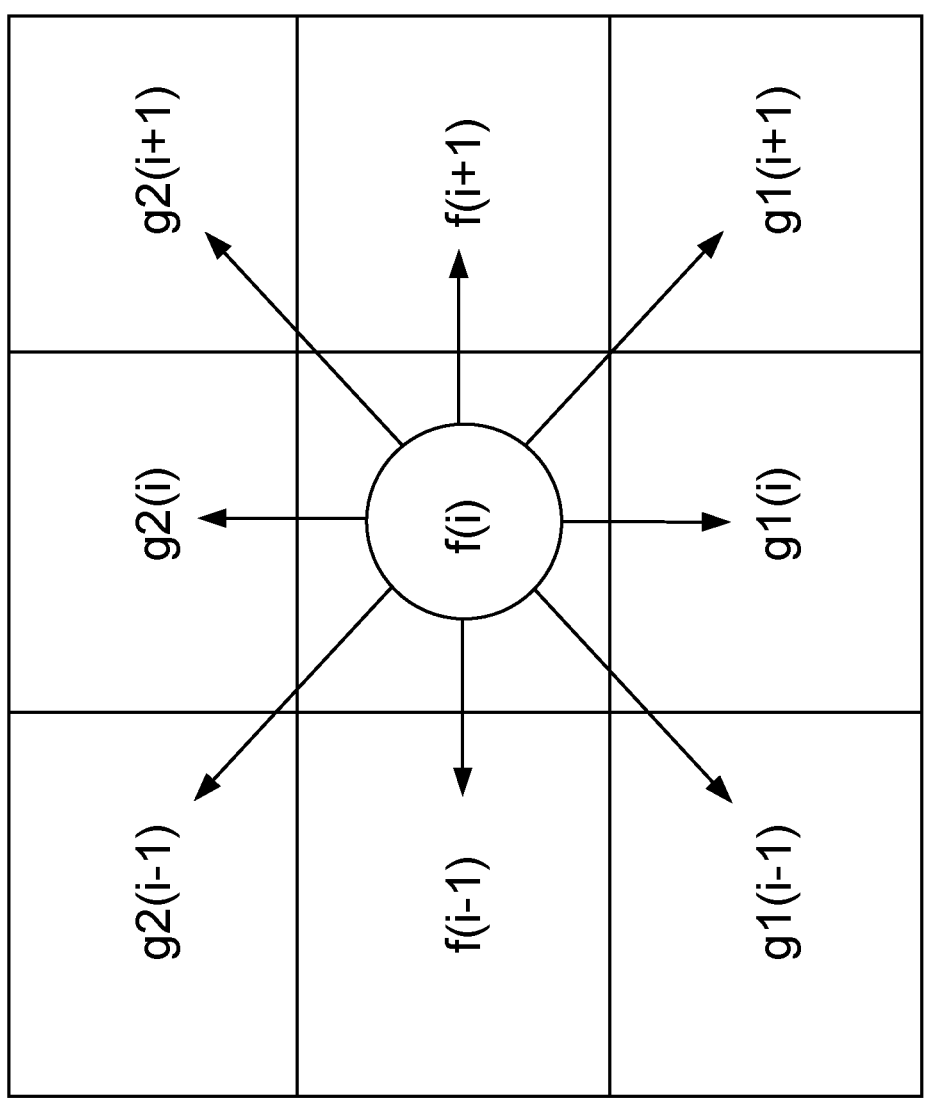
FIG. 9 schematically depicts how intrusion events may be represented in readings from adjacent measurement channels.

An actual intrusion event has been found to result in material acoustic signals spanning multiple of the measurement channels 302a-d; the multiple measurement channels 302a-d may comprise neighboring measurement channels 302a-d on the same optical fiber 112a-c, and/or neighboring measurement channels 302a-d on different optical fibers 112a-c. This is depicted in FIG. 9, which schematically depicts how intrusion events may be represented in readings from nearby measurement channels 302a-d. More particularly, FIG. 9 employs notation in which g1( ) and g2( ) respectively represent the first and second ground optical fibers 112a,b, and f( ) represents the fence optical fiber 112c. The parameters i–1, i, and i+1 refer to any three neighboring measurement channels 302a-d, such as the first through third measurement channels 302a-c. Accordingly, FIG. 9 schematically depicts, for example, the first through third measurement channels 302a-c of each of the optical fibers 112a-c, in which the parameter i corresponds to the second measurement channel 302b. FIG. 9 corresponds to the optical fiber 112a-c placement depicted in FIG. 3; that is, despite f(i) being shown in the center of the grid of FIG. 9, the measurement channels 302a-d of the first optical fiber 112a are acoustically proximate to the fence optical fiber 112c and accordingly considered to be neighboring the fence optical fiber 112c for the purposes of this disclosure.

To schematically represent an acoustic signal that spans multiple of the measurement channels 302a-d. FIG. 9 illustrates as an example a potential intrusion event that occurs on measurement channel f(i). In the example where the parameter i corresponds to the second measurement channel 302b, this represents an acoustic signal measured on that channel of the fence optical fiber 112c that qualifies as a potential intrusion event as discussed above in respect of FIG. 4 and that is in excess of the wind detection threshold. In isolation, it may not be possible for the intrusion detection system 200 to determine whether the event at measurement channel f(i) is caused by an actual intrusion event or wind. However, by determining whether the potential intrusion event is also measured on a neighboring or adjacent one of the measurement channels 302a-c, as represented by the arrows emanating from f(i) in FIG. 9, the intrusion detection system 200 can confirm that the potential intrusion event is an actual intrusion event and not simply the result of the wind.

In respect of the first and third measurement channels 302a,c on the fence optical fiber 112c, respectively represented as f(i–1) and f(i+1), the potential intrusion event corresponding to f(i) may also be detected on neighboring channels 302$a,c$ represented by f(i−1) and f(i+1). If the signal is also recorded on one or both of the first and third measurement channels 302$a,c$ such that a potential intrusion event is indicated (e.g., the intrusion criteria as described above in respect of FIGS. 4A and 4B are satisfied), then the intrusion detection system 200 concludes that the potential intrusion event is an actual intrusion event and is not caused by wind.

Similarly, in respect of any of the first through third measurement channels 302$a$-$c$ of the first and second ground optical fibers 112$a,b$ represented by g2(i−1), g2(i), g2(i+1), g1(i−1), g1(i), and g1(i+1) in FIG. 9, if the potential intrusion event that satisfies the criteria described above in respect of FIGS. 4A and 4B is also recorded on any of those neighboring channels 302$a$-$c$ on the first or second ground optical fibers 112$a,b$, then the intrusion detection system 200 concludes that the potential intrusion event is an actual intrusion event and is not caused by wind.

In at least some embodiments, the intrusion detection system 200 may additionally or alternatively rely on cross-correlation between the measurement channel 302$a$-$d$ that detects a first acoustic signal and a second acoustic signal detected on another of the measurement channels 302$a$-$d$, either on the same optical fiber 112$a$-$c$ that detected the first acoustic signal or on a different one of the optical fibers 112$a$-$c$ as described above in respect of FIG. 9. Given a sufficient cross-correlation, the intrusion detection system 200 may determine that a potential intrusion event is an actual intrusion event if the cross-correlation of first and second acoustic signals measured on neighboring channels satisfies a cross-correlation threshold. With cross-correlation normalized to [0,1], an example cross-correlation threshold for the depicted embodiments 0.8.

Figure 11:
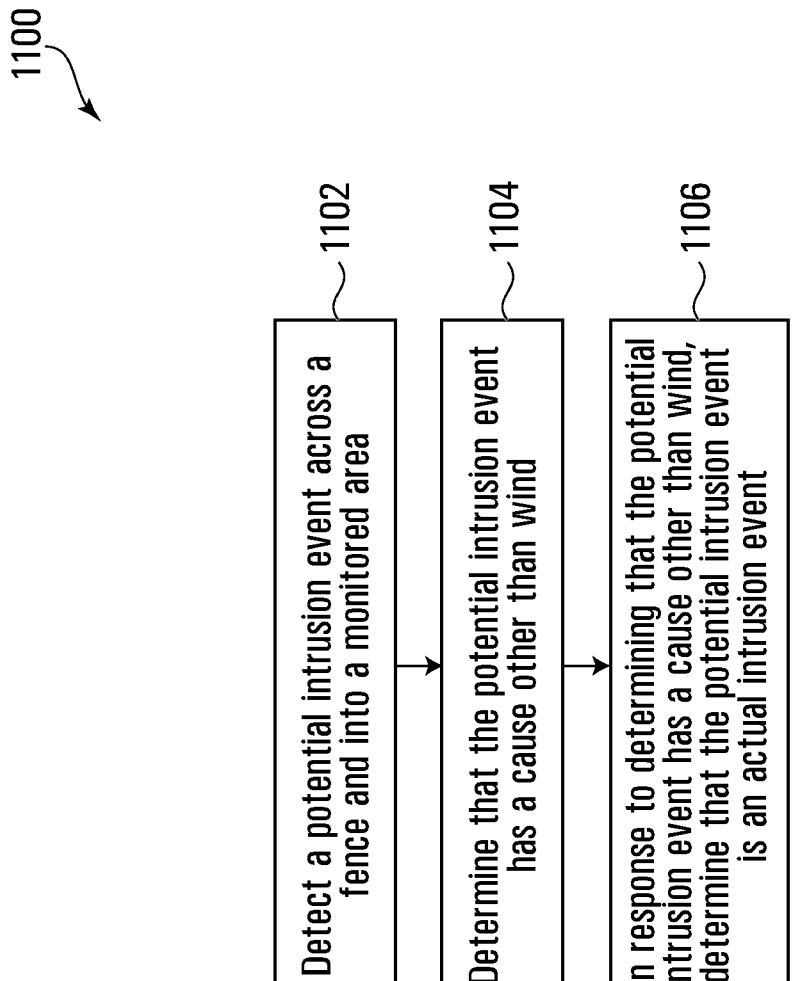
FIG. 11 depicts an intrusion detection method, according to an example embodiment.

The discussion above in respect of FIG. 9 is represented in the flowchart of FIG. 11, which depicts an example intrusion detection method 1100 performed by the intrusion detection system 200. At block 1102, the system 200 detecting a potential intrusion event across the fence 204 and into the monitored area 202. The system 200 at block 1104 then determines that the potential intrusion event has a cause other than wind. This may be done as described above in respect of FIG. 9. At block 1106, once the system 200 confirms that the potential intrusion event is not caused by the wind, it determines that the potential intrusion event is an actual intrusion event.

Figures 10A, 10B, 10C:
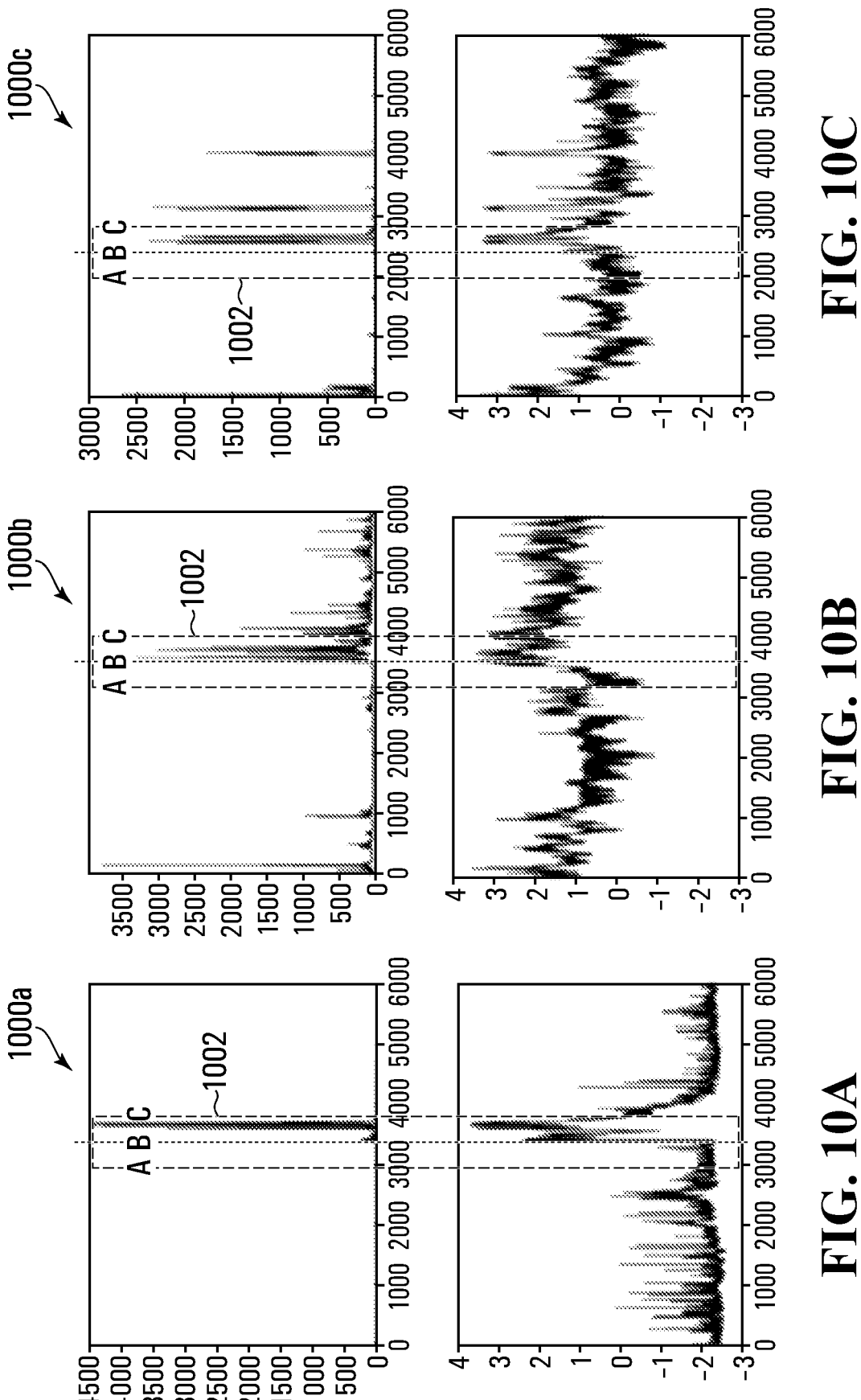
FIGS. 10A-10C depict various graphs depicting energy acceleration resulting from intrusion events and/or wind.

Differentiating between intrusion events and wind may additionally or alternatively be done on the basis of energy acceleration. FIGS. 10A-10C depict first through third graph pairs 1000$a$-$c$, in which the top graph of each pair 1000$a$-$c$ depicts waveforms using a linear scale and the bottom graph of each pair 1000$a$-$c$ depicts waveforms using a log scale. The first graph pair 1000$a$ depicts an intrusion event without wind; the second graph pair 1000$b$ depicts wind without an intrusion event; and the third graph pair 1000$c$ depicts an intrusion event with wind. Each graph comprises a window 1002 that starts at line A, terminates at line C, and is divided by line B. In the embodiments of FIGS. 10A-10C, line B bisects the window 1002. The energy acceleration for any given window 1002 is determined as the sum of the magnitude or power of the signal from line B to line C, divided by the sum of the magnitude or power of the signal from line A to line B. If the magnitude is used in the numerator summation, then the magnitude is correspondingly used in the denominator summation; similarly, if power is used in the numerator summation, then power is correspondingly used in the denominator summation.

As evidenced by FIGS. 10A-10C, empirically, energy acceleration is higher for intrusion events (FIG. 10A) than wind (FIG. 10B). Consequently, the energy acceleration for an intrusion event alone (FIG. 10A) or an intrusion event combined with wind (FIG. 10C) is higher than energy acceleration for wind alone (FIG. 10B). Consequently, the intrusion detection system 200 may determine an event is an intrusion event if the energy acceleration of the corresponding signal satisfies an intrusion energy acceleration threshold, such as 45. Otherwise, the intrusion detection system 200 may conclude that the cause of the potential intrusion was wind.

In response to detection of an intrusion event following block 1006 for example, the intrusion detection system 200 may cause one or more of the cameras 206$a$-$d$ to orient such that they image the area corresponding to the intrusion event. For example, if the system 200 determines that an intrusion event has occurred on the first measurement channel 302$a$ of the fence optical fiber 112$c$, the system 200 may automatically orient the second and third video cameras 206$b,c$ to image the fence optical fiber's 112$c$ first measurement channel 302$a$ and the corresponding area on the fence 204.

The embodiments have been described above with reference to flowcharts and block diagrams of methods, apparatuses, systems, and computer program products. In this regard, the flowcharts and block diagrams in the figures illustrate the architecture, functionality, and operation of possible implementations of various embodiments. For instance, each block of the flowcharts and block diagrams may represent a module, segment, or portion of code, which comprises one or more executable instructions for implementing the specified logical function(s). In some alternative embodiments, the functions noted in that block may occur out of the order noted in those figures. For example, two blocks shown in succession may, in some embodiments, be executed substantially concurrently, or the blocks may sometimes be executed in the reverse order, depending upon the functionality involved. Some specific examples of the foregoing have been noted above but those noted examples are not necessarily the only examples. Each block of the block diagrams and flowcharts, and combinations of those blocks, may be implemented by special purpose hardware-based systems that perform the specified functions or acts, or combinations of special purpose hardware and computer instructions.

Each block of the flowcharts and block diagrams and combinations thereof can be implemented by computer program instructions. These computer program instructions may be provided to a processing apparatus of a general-purpose computer, special-purpose computer, or other programmable data processing apparatus to produce a machine, such that the instructions, which execute via the processing apparatus of the computer or other programmable data-processing apparatus, create means for implementing the functions or acts specified in the blocks of the flowcharts and block diagrams. The processing apparatus may comprise any suitable processing unit such as a processor, microprocessor, programmable logic controller, a microcontroller (which comprises both a processing unit and a non-transitory computer readable medium), or system-on-a-chip (SoC). As an alternative to an implementation that relies on processor-executed computer program code, a hardware-based implementation may be used. For example, an application-specific integrated circuit (ASIC), field programmable gate array (FPGA), or other suitable type of hardware implementation may be used as an alternative to or to supplement an implementation that relies primarily on a processor executing computer program code stored on a computer medium.

These computer program instructions may also be stored in a computer-readable medium that can direct a computer, other programmable data-processing apparatus, or other devices to function in a particular manner, such that the instructions stored in the computer-readable medium produce an article of manufacture including instructions that implement the function or act specified in the blocks of the flowcharts and block diagrams. The computer program instructions may also be loaded onto a computer, other programmable data-processing apparatus, or other devices to cause a series of operational steps to be performed on the computer, other programmable apparatus or other devices to produce a computer-implemented process such that the instructions that execute on the computer or other programmable apparatus provide processes for implementing the functions or acts specified in the blocks of the flowcharts and block diagrams.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through one or more intermediate elements or devices via an electrical element, electrical signal or a mechanical element depending on the particular context. The term "and/or" herein when used in association with a list of items means any one or more of the items comprising that list.

As used herein, a reference to "about" or "approximately" a number or to being "substantially" equal to a number means being within +/−10% of that number.

While the disclosure has been described in connection with specific embodiments, it is to be understood that the disclosure is not limited to these embodiments, and that alterations, modifications, and variations of these embodiments may be carried out by the skilled person without departing from the scope of the disclosure. It is furthermore contemplated that any part of any aspect or embodiment discussed in this specification can be implemented or combined with any part of any other aspect or embodiment discussed in this specification, so long as those parts are not mutually exclusive.

The invention claimed is:

1. A wind detection method comprising: measuring a first acoustic signal generated by an acoustic sensor positioned to be actuated in response to wind;

determining an average value of the first acoustic signal over a sampling duration;

determining that the average value of the first acoustic signal satisfies a wind detection threshold; and after determining that the average value of the first acoustic signal satisfies a wind detection threshold, determining that the first acoustic signal was generated by the wind.

2. The method of claim 1, wherein the acoustic sensor comprises a first optical fiber comprising at least one pair of fiber Bragg gratings (FBGs) tuned to reflect identical wavelengths.

3. The method of claim 2, wherein measuring the first acoustic signal comprises:

shining a reference light pulse and a sensing light pulse along the first optical fiber, the reference light pulse being delayed compared to the sensing light pulse by a predetermined period of time selected such that the reference light pulse reflected by a first FBG of the at least one pair of FBGs interferes with the sensing light pulse reflected by a second FBG of the at least one pair of FBGs to form a combined interference pulse;

detecting the light reflected by the at least one pair of FBGs; and detecting the combined interference pulse and detecting a phase difference between the reflected reference light pulse and the reflected sensing light pulse of the combined interference pulse to produce a first acoustic signal measurement.

4. The method of claim 2, wherein:

the first optical fiber comprises measurement channels respectively corresponding to different longitudinal positions along the first optical fiber;

each of the measurement channels comprises at least one pair of the FBGs tuned to reflect identical wavelengths; and the first acoustic signal is measured at one of the measurement channels.

5. The method of claim 2, wherein the first optical fiber is mounted on a fence.

6. The method of claim 1, wherein the average value of the first acoustic signal is a median of the first acoustic signal.

7. The method of claim 1, wherein the average value of the first acoustic signal is the median of a root mean square of the first acoustic signal.

8. The method of claim 1, wherein the sampling duration is at least 15 minutes.

9. An intrusion detection method comprising:

detecting a potential intrusion across a fence and into a monitored area, wherein the detecting comprises measuring a first acoustic signal generated by an acoustic sensor positioned to monitor for intrusions into a monitored area;

determining that the potential intrusion has a cause other than wind; and in response to determining that the potential intrusion is has a cause other than wind, determining that the potential intrusion is an actual intrusion.

10. The method of claim 9, further comprising orienting a video camera at a location corresponding to a source of the actual intrusion event.

11. The method of claim 9, wherein determining that the potential intrusion event has a cause other than wind comprises determining that an energy acceleration of the first acoustic signal satisfies an intrusion energy acceleration threshold.

12. The method of claim 9, wherein determining that the potential intrusion event has a cause other than wind comprises:

determining an average value of the first acoustic signal over a sampling duration; and determining that the average value of the first acoustic signal satisfies a wind detection threshold.

13. The method of claim 12, wherein the average value of the first acoustic signal is a median of the first acoustic signal, and wherein the sampling duration is at least 15 minutes.

14. The method of claim 9, wherein the acoustic sensor comprises a first optical fiber comprising at least one pair of fiber Bragg gratings (FBGs) tuned to reflect identical wavelengths.

15. The method of claim 14, wherein measuring the first acoustic signal comprises:

shining a reference light pulse and a sensing light pulse along the first optical fiber, the reference light pulse being delayed compared to the sensing light pulse by a predetermined period of time selected such that the reference light pulse reflected by a first FBG of the at least one pair of FBGs interferes with the sensing light pulse reflected by a second FBG of the at least one pair of FBGs to form a combined interference pulse;

detecting the light reflected by the at least one pair of FBGs; and detecting the combined interference pulse and detecting a phase difference between the reflected reference light pulse and the reflected sensing light pulse of the combined interference pulse to produce a first acoustic signal measurement.

16. The method of claim 14, wherein:

the first optical fiber comprises measurement channels respectively corresponding to different longitudinal positions along the first optical fiber;

each of the measurement channels comprises at least one pair of the FBGs tuned to reflect identical wavelengths; and the first acoustic signal is measured at one of the measurement channels.

17. The method of claim 16, wherein determining that the potential intrusion event has a cause other than wind comprises:

measuring a second acoustic signal at another of the measurement channels on the first optical fiber, or on a measurement channel of a second optical fiber in acoustic proximity to the first optical fiber;

determining a cross-correlation between the first and second acoustic signals; and determining that the cross-correlation satisfies a cross-correlation threshold.

18. The method of claim 16, wherein determining that the potential intrusion event has a cause other than wind comprises:

measuring a second acoustic signal at another of the measurement channels on the first optical fiber, or on a measurement channel of a second optical fiber in acoustic proximity to the first optical fiber; and determining that each of the first and second acoustic signals satisfy an intrusion threshold.

19. The method of claim 17, wherein one of the first and second optical fibers is mounted on a fence, and the other of the first and second optical fibers is on or buried in ground.

20. A system comprising:

at least one optical fiber comprising at least one pair of fiber Bragg gratings (FBGs) tuned to reflect identical wavelengths, wherein the at least one optical fiber is positioned to monitor for intrusions into a monitored area;

an optical interrogator optically coupled to the at least one optical fiber and configured to perform optical interferometry using the at least one optical fiber; and at least one processing device communicatively coupled to the optical interrogator, wherein the at least one processing device is configured to perform an intrusion detection method comprising:

detecting a potential intrusion across a fence and into a monitored area, wherein the detecting comprises measuring a first acoustic signal generated by the at least one optical fiber;

determining that the potential intrusion has a cause other than wind; and in response to determining that the potential intrusion is has a cause other than wind, determining that the potential intrusion is an actual intrusion.

* * * * *